SUPERCONDUCTING CONTROLLED INDUCTANCE CIRCUITS

Filed Feb. 13, 1963 4 Sheets-Sheet 1

INVENTORS.
CARL R. CASSIDY
ALBERT J. MEYERHOFF
BY [signature]
ATTORNEY

SUPERCONDUCTING CONTROLLED INDUCTANCE CIRCUITS

Filed Feb. 13, 1963 4 Sheets-Sheet 2

INVENTORS.
CARL R. CASSIDY
ALBERT J. MEYERHOFF
BY
ATTORNEY

SUPERCONDUCTING CONTROLLED INDUCTANCE CIRCUITS

INVENTORS.
CARL R. CASSIDY
ALBERT J. MEYERHOFF
BY Charles R. Hepdivaky
ATTORNEY

Sept. 27, 1966 C. R. CASSIDY ET AL 3,275,930

SUPERCONDUCTING CONTROLLED INDUCTANCE CIRCUITS

Filed Feb. 13, 1963 4 Sheets-Sheet 4

INVENTORS.
CARL R. CASSIDY
BY ALBERT J. MEYERHOFF

ATTORNEY

United States Patent Office 3,275,930

Patented Sept. 27, 1966

3,275,930
SUPERCONDUCTING CONTROLLED INDUCTANCE CIRCUITS

Carl R. Cassidy, Hatboro, and Albert J. Meyerhoff, Wynnewood, Pa., assignors to Burroughs Corporation, Detroit, Mich., a corporation of Michigan Filed Feb. 13, 1963, Ser. No. 258,268
16 Claims. (Cl. 323—44)

This invention relates to superconducting circuits and conductors and more particularly to superconducting circuits and conductors whose inductance is controlled by controlling the shielding qualities of a superconducting ground plane or shield.

Superconducting materials have been utilized to fabricate a variety of circuits and systems for performing functions similar to those performed by electronic and magnetic elements. Although superconducting circuits are operated at temperatures in the vicinity of absolute zero (0° Kelvin), this requirement is more than offset by their small physical size, rapid response, and low power consumption. Usually, superconductive circuits are operated at a fixed temperature at which the switchable elements, called gate conductors, normally exhibit superconductivity; that is, zero resistance to the flow of electrical current. In order to switch the gate conductors into their normal or resistive state in which they present a resistance to the flow of electrical current, a magnetic field of predetermined magnitude is applied to the gate conductors. Generally, the required magnetic field is generated by means of current flow through conductors arranged in magnetic field applying relationship with the gate conductors. In order to reduce the power loss caused by current flow through the control conductors, the control conductors are fabricated from a superconducting material that remains superconducting in the presence of a magnetic field that causes the superconducting gate conductors to become resistive. That is, the superconducting control material has a higher "critical" magnetic field than the superconducting gate material. The "critical" magnetic field for any superconducting material may be defined as the smallest magnetic field intensity that will cause the superconductor to switch to its normal or resistive state.

Heretofore in the prior art, each time a current was switched from one superconducting gate conductor path into another, energy was transiently dissipated due to $I^2R$ losses in the gate conductor. Even though the relaxation time for superelectrons is such that the superconducting gates can be switched from a superconducting state into a resistive state in picoseconds ($10^{-12}$ seconds), the redistribution of current is at least four or five orders of magnitude slower due to the inductance and resistance present in the circuit. This causes the current to continue to flow briefly through the resistive gate conductor and to dissipate energy therein in the form of $I^2R$ losses. The sum of all such energy losses causes local heating which can result in faulty opeartion at high frequencies.

These and other disadvantages of the prior art are materially reduced by the present invention which discloses unique and novel superconducting conductors and circuits whose inductance is controlled by controlling the shielding qualities of a superconducting ground plane or shield. By controlling the inductance of superconducting conductors, current flow can be rapidly switched from one superconducting conductor into another without causing either superconducting conductor to become resistive. This substantially eliminates the $I^2R$ energy losses associated with resistive current switching and also results in much lower switching times.

Accordingly, an object of this invention is to provide a superconductor having a controlled inductance.

A further object of this invention is to provide a superconductor whose inductance is controlled by controlling the shielding qualities of a superconducting ground plane or shield.

Another object of this invention is to provide a superconducting current path having a controlled inductance whereby current may be rapidly switched from one superconducting path into another without producing significant $I^2R$ energy losses.

A still futrher object of this invention is to provide a high speed superconducting current switching circuit.

Another object of this invention is to provide a high speed tree type superconducting current switching circuit.

Still another object of this invention is to provide a high speed controlled coupling circuit.

In accordance with a feature of the present invention there is provided a superconducting controlled inductance circuit which includes a superconducting ground plane having a superconducting conductor associated therewith. Means are provided for causing a portion of the ground plane adjacent said superconducting gate conductor to become resistive thereby greatly increasing the inductance of the superconducting gate conductor.

In accordance with another feature of the present invention, a superconducting controlled inductance circuit is provided which utilizes a ground plane of superconducting material having at least one opening thereon. A superconducting material having a critical magnetic field less than the critical magnetic field of the ground plane material is located at the opening. At least one superconducting current path is associated with the ground plane and at least a portion of this superconducting current path is located adjacent the area of the opening. Magnetic field means are provided to cause the superconducting material located at the opening in said ground plane to become resistive thereby causing the inductance of the superconducting current path to greatly increase.

In accordance with still another feature of the present invention a controlled inductance circuit is provided which comprises means for controlling the inductance of a superconducting conductor and includes a ground plane characterized as having at least one area that has a critical magnetic field that is lower than the critical magnetic field for the remaining area of the ground plane. At least one superconducting conductor, having a critical magnetic field greater than the area having the lower critical magnetic field than the remaining area of said ground plane, is located adjacent said ground plane with at least a portion of it being adjacent the area having a lower critical magnetic field. Superconducting current means are provided for causing the area on the ground plane having a lesser critical magnetic field to become resistive thereby greatly increasing the inductance of the superconducting conductor.

In accordance with another feature of this invention a cryotronic controlled shield circuit is provided which comprises means for controlling the magnetic shield qualities of a ground plane and includes a ground plane of superconducting material. At least one superconducting conductor is positioned adjacent the ground plane for providing a superconducting current path, and at least one superconducting control conductor is also positioned adjacent the ground plane at an area where it is desired to control the shielding qualities of the ground plane. Both the current path superconducting conductor and the control superconducting conductor have a higher critical magnetic field than the ground plane superconducting material. By applying a current to the control superconducting conductor, a selected area of the ground plane lying adjacent said current path superconducting conductor is caused to become resistive thereby greatly increasing the inductance of the current path superconducting conductor. Utilization means responsive to the change in inductance in the current path superconducting conductor is coupled to said conductor.

In accordance with a still further feature of this invention a high speed current switching circuit is provided which utilizes means for controlling the inductance of a superconducting conductor and includes a ground plane of superconducting material having at least one area characterized as having a lower critical magnetic field than the remaining area of the ground plane. At least two parallel superconducting current paths are disposed adjacent the ground plane such that a portion of at least one of the parallel current paths is adjacent the area on the ground plane having the low critical magnetic field. Superconducting means are provided for causing the ground plane area having the low critical magnetic field to become resistive thereby greatly increasing the inductance of selected ones of the parallel current paths which enables current to be rapidly switched from the selected superconducting current path into the other.

In accordance with another feature of this invention a high speed switching circuit is provided which utilizes a superconducting ground plane. A superconducting conductor tree circuit which provides a plurality of superconducting current paths and includes an apex and a plurality of branch current paths disposed adjacent the ground plane. Means are provided whereby the ground plane adjacent one or more of the superconducting branch current paths is caused to become resistive thereby increasing the inductance of the adjacent superconducting conductor which enables rapid switching of the current through selected ones of the plurality of branch current paths.

Also, in accordance with a further feature of this invention a controlled coupling transformer is provided which utilizes means for controlling the shielding qualities of superconducting shield and includes a superconducting primary winding and a superconducting secondary winding with at least a portion of the primary winding located adjacent a portion of the secondary winding. A shield of superconducting material is located between the adjacent portions of the primary and secondary windings. Superconducting current means are provided for causing the superconducting shield to become resistive thereby enabling the adjacent portions of said primary and secondary portions to be flux linked.

The exact nature of this invention as well as other objects and features thereof will be readily apparent from consideration of the following detailed description relating to the annexed drawings in which.

Figure 2A:
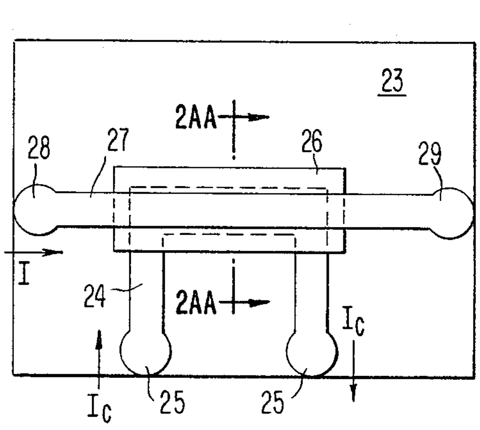
FIG. 2A illustrates another preferred embodiment of this invention.
Figure 2A:
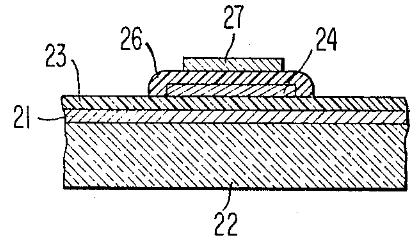
Figure 2B:
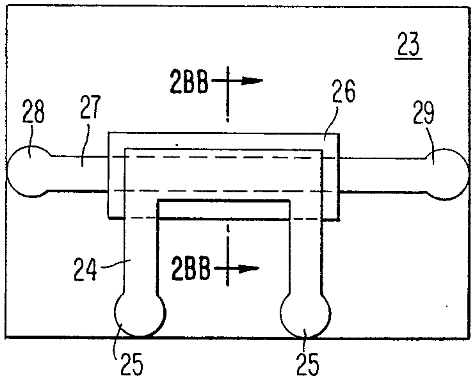
Figure 2B:
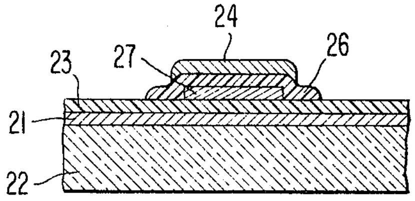
Figure 2C:
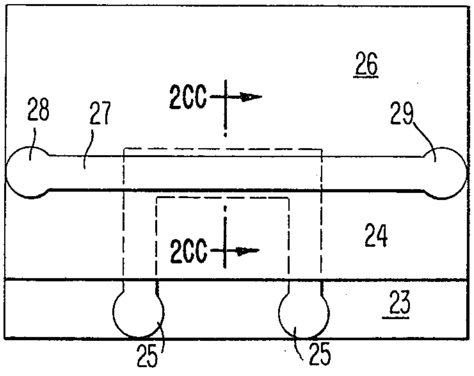
Figure 2C:
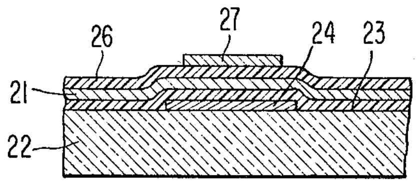
Figure 3A:
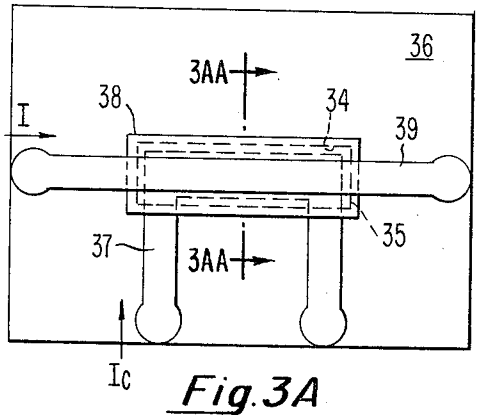
Figure 3A:
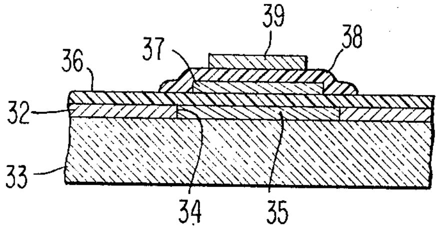
Figure 3B:
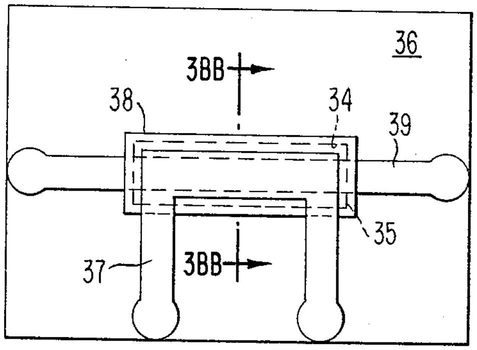
Figure 3B:
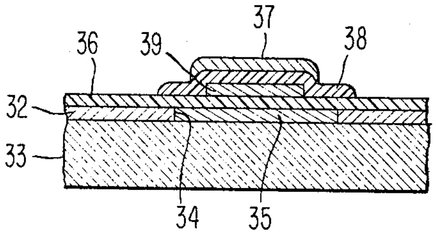
Figure 3C:
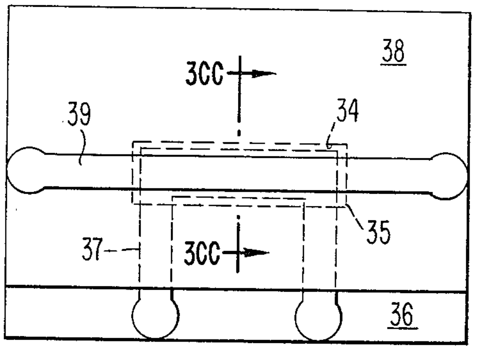
Figure 3C:
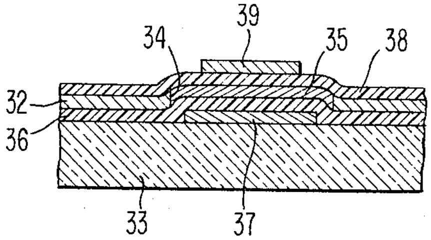
Figures 4, 6:
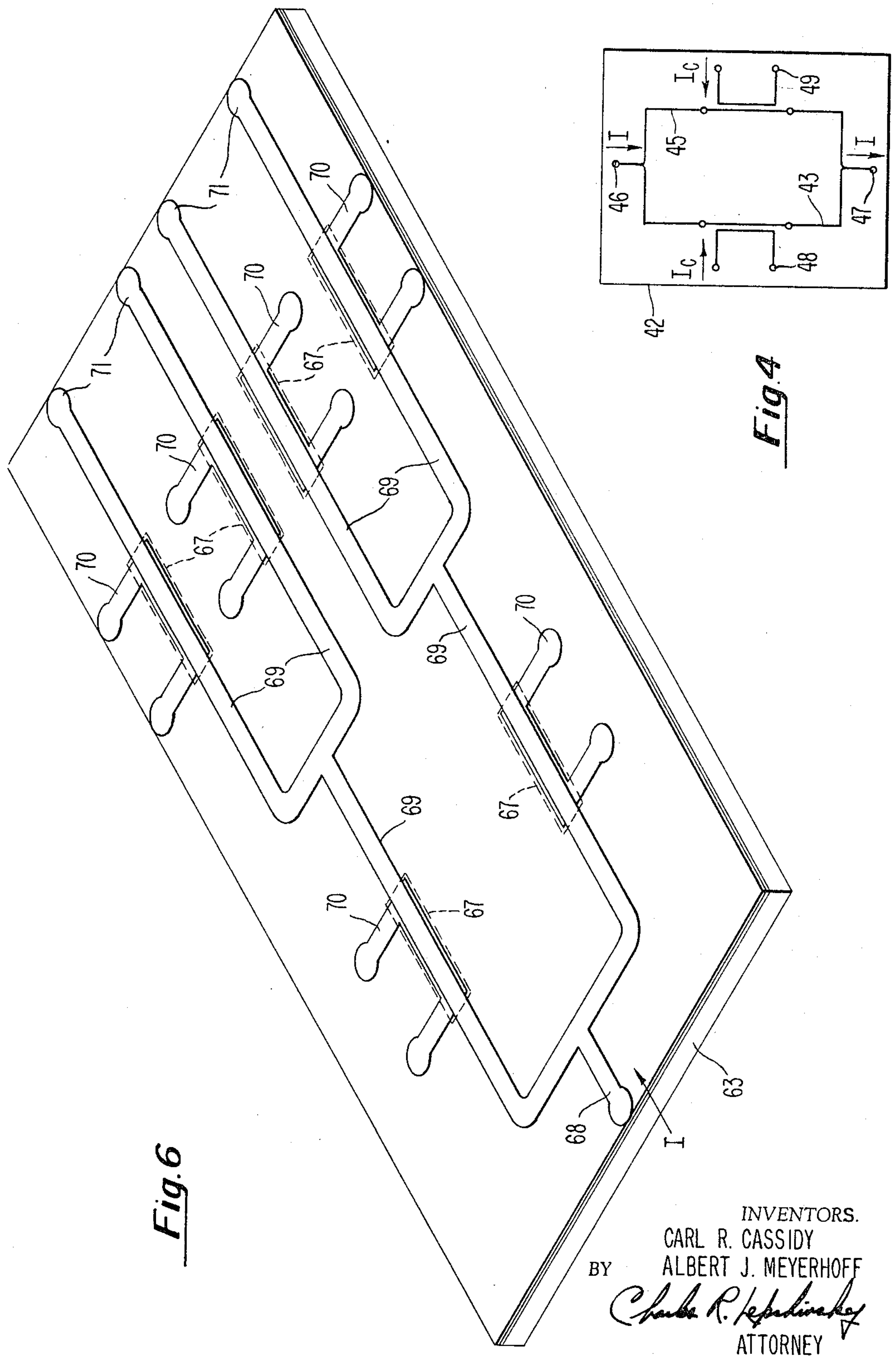
Figure 5:
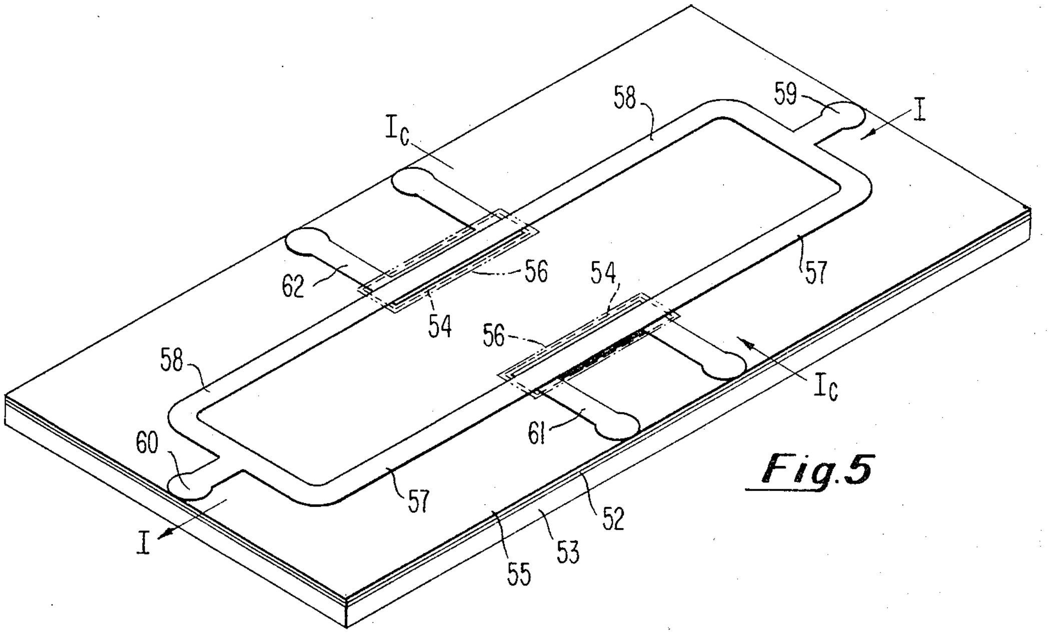
Figure 7:
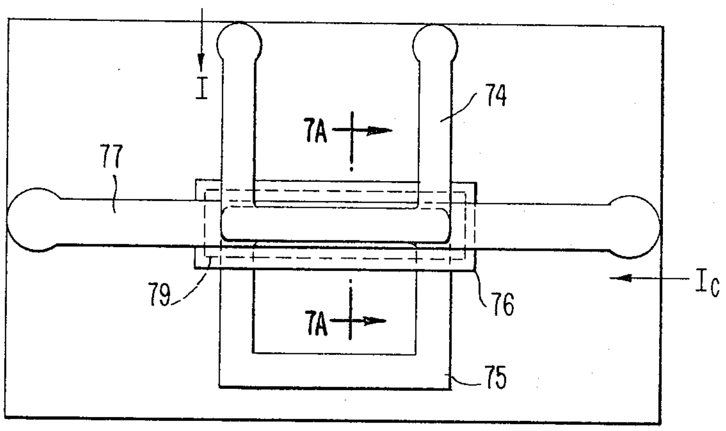
Figure 7A:
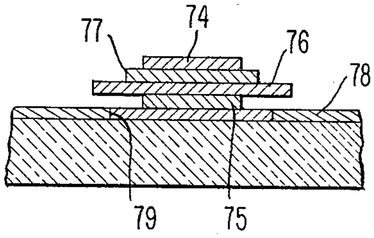

FIG. 2AA is a sectional view taken along line 2AA of FIG. 2A which shows in detail the manner in which the device of FIG. 2A is fabricated;

FIG. 2B illustrates a modification of the device shown in FIG. 2A;

FIG. 2BB is a sectional view taken along line 2BB of FIG. 2B which shows in detail the manner in which the device of FIG. 2B is fabricated;

FIG. 2C illustrates a further modification of the embodiment shown in FIG. 2A;

FIG. 2CC is a sectional view taken along line 2CC of FIG. 2C which shows in detail the manner in which the device of FIG. 2C is fabricated;

FIG. 3A illustrates another preferred embodiment of the present invention;

FIG. 3AA is a sectional view taken along line 3AA of FIG. 3A which shows in detail the manner in which the device of FIG. 3A is fabricated;

FIG. 3B illustrates a modification of the device shown in FIG. 3A;

FIG. 3BB is a sectional view taken along line 3BB of FIG. 3B which shows in detail the manner in which the device in FIG. 3B is fabricated;

FIG. 3C illustrates a further modification of the devices shown in FIG. 3A;

FIG. 3CC is a sectional view taken along line 3CC of FIG. 3C which shows in detail the manner in which the device of FIG. 3C is fabricated;

FIG. 4 illustrates a utilization device which incorporates the device shown in FIGS. 2A, 2B and 2C;

FIG. 5 illustrates a superconducting bistable device fabricated in accordance with the present invention;

FIG. 6 illustrates a superconducting tree type circuit fabricated in accordance with the present invention;

FIG. 7 illustrates a controlled coupled superconducting transformer fabricated in accordance with the present invention; and FIG. 7A is a sectional view taken along line 7A of FIG. 7 which shows in detail the manner in which the device of FIG. 7 is fabricated.

Figure 1:
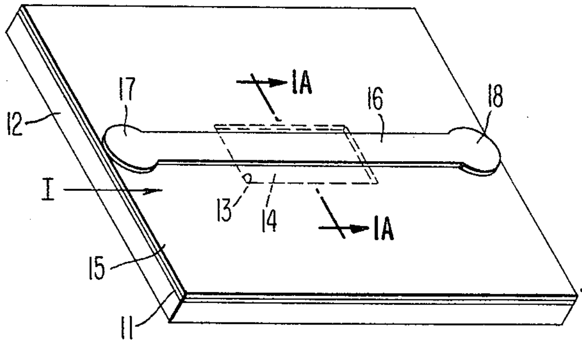
FIG. 1 illustrates one preferred embodiment of this invention.
Figure 1A:
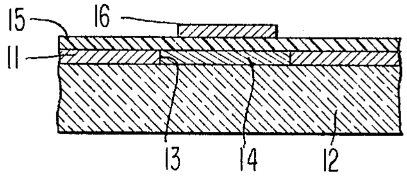
FIG. 1A is a sectional view taken along line 1A of FIG. 1 which shows in detail the manner in which the device of FIG. 1 is fabricated.

Referring now to the drawings, in which like reference characters designate like or corresponding parts throughout the several views, there is shown in FIGS. 1 and 1A an embodiment of the present invention which includes a thin-film superconducting ground plane 11 which is deposited on a suitable substrate 12 of material such as glass. The superconducting ground plane 11 contains an opening 13 thereon which may also be characterized as a cut-out portion or discontinuity. Located at this opening is a second type superconducting material 14 having a lower critical magnetic field than the surrounding superconducting ground plane material 11. This second type superconducting material 14 may be characterized as being located at, located adjacent, completely covering, completely filling or located in proximity to the opening 13. Covering the superconducting ground plane 11 and the second type superconducting material 14 is a layer of insulation 15 which may be deposited thereon. A superconducting conductor 16 is deposited on the layer of insulation and has at least a portion of its length adjacent the second type superconducting material 14 located at the opening 13 in the superconducting ground plane. Input terminal means 17 are located at one end of the superconducting conductor and output means 18 are located at the opposite end. The superconducting conductor 16 has a higher critical magnetic field than the second type superconducting material located at the opening 13. For example, the superconducting conductor 16 and the ground plane material 11 may be fabricated from lead and the second type superconducting material 14 located at the opening 13 may be fabricated from tin.

Assume now that a current I is applied to the input terminal 17 and flows out of the output terminal 18, assume this current I generates a magnetic field around the superconducting conductor 16 the magnitude of which does not exceed or equal the critical magnetic field of the superconducting ground plane 11 material or the second type superconducting material 14. This prevents the magnetic field from penetrating the superconducting ground plane 11 material or the second type material 14. This causes the magnetic field to be concentrated fairly uniformly between the superconducting conductor 16 and the superconducting ground plane 11 material and the second type material 14 and is substantially negligible elsewhere. That is, the shielding qualities of the superconducting ground plane 11 material and the second type material 14 does not permit the magnetic field around the superconducting conductor 16 to be symmetrical. This results in the superconducting conductor 16 having a very small inductance component. Assume now that the current I applied to the input terminal 17 gradually increasing thereby increasing the magnetic field density between the superconducting conductor 16 and the superconducting ground plane 11 material and the second type material 14. At some point the density of the magnetic field located beneath the superconducting conductor 16 will equal the critical magnetic field for the second type critical magnetic field 14. When this occurs the second type superconducting material 14 will assume an intermediate state, as described in more detail herein below, which will permit further increases in magnetic flux to penetrate the second type material 14 in a manner as though the material 14 was in a resistive state. This causes the inductance of the superconducting conductor 16 to greatly increase. For example, it can be shown that this will cause the inductance of the superconducting conductor to increase more than a hundred times. Inasmuch as the superconducting conductor 16 material and the superconducting ground plane 11 material have a higher critical magnetic field than the second type superconducting material 14, they will remain superconducting.

When the second type superconducting material 14 enters the intermediate state due to a critical magnetic field equal to or slightly larger than the critical magnetic field, the superconducting material 14 does not become completely resistive but may be characterized as containing areas of superconductivity intermingled with areas of resistivity. Under these conditions the second type superconducting material 14 is believed to have a high inductance component and very small $I^2R$ power losses. As the magnetic field in the area of the second type material 14 is increased, it becomes more resistive. For purposes of describing the present invention the term "resistive" will include an area which is partially resistive and partially superconducting i.e. an intermediate state, as well as an area that is entirely resistive. However, even when the material 14 becomes entirely resistive, the $I^2R$ losses remain very small. It is clear then that the device of FIG. 1 illustrates a superconducting controlled inductance circuit having no significant $I^2R$ losses.

Referring now to FIG. 2A and FIG. 2AA, there is shown a modification of the device shown in FIGS. 1 and 1A, comprising a continuous superconducting ground plane 21 material which is deposited on a suitable substrate 22 such as glass. A layer of insulation 23 covers the ground plane 21 material and deposited upon this layer of insulation 23 is a superconducting substantially U-shaped control conductor 24 having an input terminal 25 to which a control current $I_C$ may be applied. The base of the U-shaped control conductor 24 is covered with a layer of insulation 26 and deposited on this insulation and adjacent to the base of the control conductor 24 is a superconducting conductor 27 having an input terminal 28 and an output terminal 29. Both the superconducting conductor 27 and the superconducting control conductor 24 are fabricated from a material having a higher critical magnetic field than the continuous ground plane 21 material. For example, the ground plane 21 material may be fabricated from tin, and the superconducting conductor 27 and the control conductor 24 may be fabricated from lead.

The operation of the device shown in FIGS. 2A and 2AA is such that as long as the continuous ground plane 21 remains superconducting the superconducting conductor 27 has a very small inductance component. However, whenever the current $I_C$ applied to the control conductor 24 creates a magnetic field beneath it that exceeds the critical magnetic field of the ground plane 21, the ground plane material located adjacent the control 24 becomes resistive. Inasmuch as a portion of the superconducting conductor 27 is located adjacent the control conductor 24, the portion of the ground plane 21 adjacent the control conductor 24 becomes resistive and greatly increases the magnitude of the inductance of the superconducting conductor 27. As mentioned hereinabove, the ground plane becoming resistive causes the inductance of the superconducting conductor 27 to increase more than a hundred times. It is clear then that by controlling the magnitude of the current $I_C$ applied to the control conductor 24 the inductance of the superconducting conductor 27 may be controlled.

FIGS. 2B and 2BB illustrate a modification of the device shown in FIGS. 2A and 2AA wherein the superconducting conductor 27 whose inductance is to be controlled is located between the ground plane 21 and the control conductor 24. FIGS. 2C and 2CC illustrate a modification of the device shown in FIGS. 2A and 2AA wherein the ground plane 21 is located between the control conductor 24 and the superconducting conductor 27 whose inductance is to be controlled. The devices shown in FIGS. 2A through 2CC operate equally well and which one is utilized is a matter of choice. Inasmuch as the magnetic field generated by passing a current through a superconducting conductor, such as the control conductor 24, is inversely proportional to the width of the superconducting conductor, the legs of the U-shaped control conductor 24 may be made wider than the base portion thereby limiting the area of the ground plane 21 which is caused to go resistive to that adjacent the superconducting conductor 27.

Referring now to FIG. 4, there is illustrated in schematic form a bistable device which utilizes the device of FIGS. 2A and 2AA to rapidly switch current in a superconducting circuit without producing significant $I^2R$ energy losses. The device comprises a ground plane 42 upon which are deposited two parallel superconducting current paths 43 and 45 each of which utilizes the device shown in FIGS. 2A and 2AA. A current I is applied to the terminal 46 and leaves the circuit by way of the terminal 47. Whenever each of the parallel paths 43 and 45 are superconducting, the current I divides equally between them as long as their inductances are equal. Assume now that the current I is flowing through both the superconducting current paths 43 and 45 and it is desired to switch substantially all of the current I into the right hand current path 45. This can be accomplished by applying a control current $I_C$ to the control conductor 48 which causes a portion of the ground plane 42 adjacent the left hand superconducting current path 43 to become resistive. This greatly increases the inductance of this current path 43 and substantially all of the current I flowing in this current path will be substantially instantaneously switched to the right hand current path 45. In order to have the current switching as rapid as possible and therefore the change of inductance as rapid as possible, a rectangular or square pulse of current $I_C$ is applied to the control conductor 48.

Upon termination of the current pulse $I_C$ the inductance of the current path 43 again becomes very small. However, since there can be no net flux change in a superconducting circuit, substantially all of the current I will continue to flow in the superconducting current path 45. If a pulse of current $I_C$ is now applied to the control conductor 49 causing a portion of the ground plane 42 beneath it to become resistive, thereby causing the inductance of the current path 45 to increase greatly, substantially simultaneously most of the current I will be switched to the superconducting current path 43 which now has a very small inductance. It is clear from the above that very rapid switching of current in a superconducting circuit is accomplished with substantially no $I^2R$ losses because the entire circuit remains superconducting. As mentioned herein above, the $I^2R$ losses in the area of the ground plane caused to become resistive are negligible.

Due to the flux which may be trapped in the areas on the ground plane 42 caused to become resistive, the number of times the current I may be switched between the two current paths 43 and 45 may be limited. Accordingly, after the current I has been switched a few times, it may be interrupted until the control conductors 48 and 49 are again activated to select a new current path at which time the current I may again be applied and switched between the two parallel current paths. Alternatively, selected ones of the control conductors 48 and 49 may be activated before the current I is applied so that upon application of the current I it will be follow a predetermined path. Each time it is desired to change this current path, the current I may be interrupted long enough to activate the appropriate control conductors 48 and 49 after which the current I may again be applied and it will flow through the selected current path.

Referring now FIG. 3A and FIG. 3AA, there is illustrated another embodiment of the present invention which comprises a discontinuous ground plane 32 which is deposited on a suitable substrate 33 such as glass. Located at the opening 34 or discontinuity on the ground plane 32 is a second type of superconducting material 35 which can be characterized as having a lower critical magnetic field than the remaining ground plane 32 material. That is, the ground plane 32 material and the second type superconducting 35 material correspond to the ground plane 11 and the second type superconducting material 14 illustrated in conjunction with FIGS. 1 and 1A. A layer of insulation 36 is deposited over the discontinuous ground plane and deposited upon this layer of insulation is a substantially U-shaped superconducting control conductor 37 the base of which lies adjacent the second type superconducting material 35. A layer of insulation 38 is deposited over the base portion of the control conductor 37. A superconducting conductor 39 whose inductance is to be controlled is then deposited such that at least a portion of its length lies adjacent the base portion of the control conductor 37 and the second type superconducting material 35. The superconducting conductor 39 and the control conductor 37 are fabricated from material having a higher critical magnetic field than the second type superconducting material 35. For example, if the second type superconducting material 35 is tin, lead may be used to fabricate the control conductor 37, the discontinuous ground plane 32, and the conductor 39.

As long as the second type superconducting material remains superconducting, the inductance of the conductor 39 remains very small. Whenever it is desired to increase this inductance (this change in inductance can be greater than a hundred times), a control current $I_C$ is applied to the control conductor 37 which creates a magnetic field of sufficient density to cause the second type superconducting material 35 to become resistive. The magnitude of the magnetic field is arranged to be such that although it has a magnitude sufficient to cause the second type superconducting material 35 to become resistive, it is not of sufficient magnitude to cause the discontinuous ground plane 32 material or the superconducting conductor 39 material or the control conductor 37 material to become resistive.

For many applications of the device shown in FIGS. 3A and 3AA the current flowing in the superconducting conductor 39 may be in a direction such that it either aids or opposes the current $I_C$ applied to the control conductor 37. It is therefore necessary that the magnitude of the control current $I_C$ be of sufficient magnitude to render the second type superconducting material 35 resistive whenever the current I flowing in the superconducting conductor 39 is in opposition to it. Whenever the current I in the superconducting conductor 39 and the control current $I_C$ the control conductor 37 aid each other other, their combined magnetic field should be of such a value to be insufficient to cause the discontinuous ground plane 32, the superconducting conductor 39 or the control conductor 37 to become resistive. The current $I_C$ applied to the control conductor 37 can be either D.C. or A.C. depending upon the use to which the device of FIGS. 3A and 3AA is put. It is clear then that the inductance of the superconducting conductor 39 may be controlled by the current $I_C$ applied to the control conductor 37.

FIGS. 3B and 3BB illustrate a modification of the device shown in FIGS. 3A and 3AA wherein the superconducting conductor 39 whose inductance is to be controlled is located between the control conductor 37 and the ground plane materials 32 and 35. FIGS. 3C and 3CC illustrate a modification of the device shown in FIGS. 3A and 3AA wherein the superconducting ground plane materials 32 and 35 are located between the superconducting conductor 39 and the control conductor 37.

FIG. 5 illustrates in detail a high speed current switching circuit, similar to that shown in FIG. 4 in schematic form, which utilizes the change in inductance of a superconducting current path to rapidly switch current. The circuit comprises a ground plane 52 which is deposited on a suitable subtrate material 53. The ground plane 52 is characterized as having two areas 54 each having a lower critical magnetic field than the remaining area of the ground plane 52. A layer of insulation 55 covers the ground plane and deposited upon the insulation 55 adjacent the two areas 54 are substantially U-shaped control conductors 61 and 62 having their base portions adjacent the areas having the low critical magnetic field. A layer of insulation 56 covers the base portion of each of the control conductors 61 and 62. Two parallel superconducting current paths 57 and 58 are then deposited such that a portion of each parallel current path is adjacent an area 54 having a low critical magnetic field.

In the absence of a control current $I_C$ in either of the control conductors 61 and 62, a current I applied to the terminal 59 will divide equally between the two parallel current paths 57 and 58 and leave the terminal 60 as long as the inductance of the two current paths 57 and 58 are equal. By applying a pulse of current $I_C$ to the control conductor 61 substantially all of the current I will be simultaneously switched to the other superconducting current path 58. This occurs because when the associated area 54 beneath the control 61 having a low critical magnetic field is caused to become resistive, the inductance of the superconducting current path 57 greatly increases becoming very much larger than the inductance in the other superconducting current path 58. Since the current I divides between the two parallel current branches 57 and 58 inversely as to their inductances and since the inductance of the superconducting current path 57 is very much larger than the inductance of the other superconducting current path 58, substantially all of the current I will flow through the superconducting current path 58. Since there is no resistance in the circuit, the current switching time is not delayed by any $L/R$ time constants. The current switching time is dependent upon the time it takes to increase the inductance of the superconducting conductor 57 from its very low value to its very high value. By applying a rectangular or square pulse of current to the control conductor 61, this change in inductance occurs substantially simultaneously causing the current switching time to be very small.

FIG. 6 illustrates a high speed switching circuit similar to that shown in FIG. 5 but comprising a tree type circuit instead of a parallel current path circuit as shown in FIG. 5. Referring to FIG. 6 there is shown a ground plane 63 having a plurality of areas 67 characterized as having a lower critical magnetic field than the remaining area of the ground plane. A superconducting tree circuit having a plurality of current paths including an apex 68 and a plurality of branches 69 lies adjacent the ground plane such that a portion of each superconducting branch current path lies adjacent one of the areas having a low critical magnetic field. A superconducting control conductor 70 is associated with each of the areas having a low critical magnetic field for causing these areas to become resistive thereby greatly increasing the inductance of the adjacent superconducting current path. It will be clear to those skilled in the art that a current I applied to the apex 68 of the tree circuit can be routed to any one of the output terminals 71 by applying a control current to appropriate ones of the control conductors 70. Whenever it is desired to have the current I leave via a different output terminal 71, it is only necessary to energize the appropriate control conductors 70 and the current I will be switched very rapidly without producing any $I^2R$ power losses inasmuch as the superconducting tree circuit will remain always superconducting. As will be obvious to those skilled in the art, appropriate layers of insulation (not shown) must necessarily separate the various superconducting elements described above.

Due to the flux which may become trapped in the areas 67 on the ground plane 63 caused to become resistive, the number of times the current I may be switched around the tree circuit of FIG. 6 may be limited. Accordingly, after the current I has been switched a few times, it may be interrupted until the control conductors 70 are activated to produce a new current path at which time the current I may again be applied and switched around the tree circuit. Alternatively, selected ones of the control conductors 70 may be activated before the current I is applied so that upon application of the current I it will follow a predetermined path. Each time it is desired to change this path, the current I may be interrupted long enough to activate the appropriate control conductors 70 after which the current I may again be applied and it will flow through the selected current path.

FIGS. 7 and 7A illustrate a control coupling transformer which comprises a superconducting primary winding 74 and a closed loop superconducting secondary winding 75. At least a portion of the primary winding 74 is located adjacent at least a portion of the secondary winding 75 as illustrated in FIG. 7. Located between the adjacent portions of the primary and secondary windings is a superconducting shield 76 which, while superconducting, prevents flux coupling between the primary and secondary winding. Also located between the adjacent portions of the primary 74 and secondary 75 windings is a control conductor 77. The entire transformer is deposited upon a superconducting ground plane 78 having an opening 79 thereon with the portion of the secondary winding adjacent the primary winding being located adjacent this opening as illustrated in FIG. 7A. As will be obvious to those skilled in the art, appropriate layers of insulation (not shown) must necessarily separate the various superconducting elements described herein above.

The operation of the transformer is such that in the absence of a control current $I_C$ applied to the control conductor 77, the superconducting shield 76 remains superconducting and therefore prevents any flux linkage between the secondary 75 and the primary 74 in response to a current I flowing through the primary 74 winding. Whenever it is desirable to flux couple the primary winding 74 to the secondary winding 75 thereby inducing a current in the closed loop secondary winding 75, it is only necessary to apply a control current $I_C$ to the control conductor 77 of sufficient magnitude to create a magnetic field of sufficient density that causes the superconducting shield 76 to become resistive. Whenever the superconducting shield 76 becomes resistive, flux coupling exist between the primary 74 and the secondary 75 because the magnetic field created by the primary current I can now pass through the previously superconducting shield 76.

It is clear then that the device illustrated in FIGS. 7 and 7A is a controlled coupling transformer and that the coupling is controlled by controlling the resistance of a superconducting shield. For proper operation of this device, the superconducting shield 76 material has a lower critical magnetic field than the ground plane 78 material, the control 77 material, the primary winding 74 material, and the secondary winding 75 material.

Superconducting circuits and conductors have been described whose inductance is controlled by controlling the shielding qualities of a superconducting ground plane or shield. By causing a portion of a ground plane adjacent a superconducting conductor to become resistive, the magnetic field around a current carrying superconducting conductor becomes symmetrical and greatly increases the inductance of the superconducting conductor. High speed current switching circuits and a control coupling transformer have been described which utilize this technique together with various structures for controlling the inductance of a superconducting path.

What is claimed is:

1. A superconducting circuit comprising:
a ground plane of continuously superconducting material having at least one cut-out portion,
a discontinuously superconducting material having a critical magnetic field less than the critical magnetic field of said ground plane superconducting material located at said cut-out portion,
at least one current path of continuously superconducting material associated with said ground plane, and
at least a portion of said current path superconducting material also located at the area of said cut-out portion.

2. A superconducting circuit comprising:
a ground plane of first type superconducting material having at least one opening thereon,
a second type superconducting material located adjacent said opening,
at least one current path of continuously superconducting material associated with said ground plane such that at least a portion of said current path is adjacent said second type material, and
said second type material having a lower critical magnetic field than said ground plane and said current path material.

3. A controlled inductance circuit comprising:
means for controlling the inductance of a continuously superconducting conductor including;
a superconducting ground plane characterized as having at least one area that has a critical magnetic field which is lower than the critical magnetic field for the remaining area of said ground plane,
at least one continuously superconducting conductor whose inductance is to be controlled associated with said ground plane,
at least a portion of said superconducting conductor being adjacent said ground plane area having a lower critical magnetic field,
means associated with said ground plane area having a lower critical magnetic field for causing said area to become resistive thereby increasing the inductance of said continuously superconducting conductor, and
means connected to said superconducting conductor for utilizing said increased inductance.

4. A controlled inductance circuit comprising:
means for controlling the inductance of a continuously superconducting conductor including:
a ground plane characterized as having at least one area that has a critical magnetic field which is lower than the critical magnetic field for the remaining area of said ground plane,
at least one continuously superconducting conductor whose inductance is to be controlled associated with said ground plane and having a critical magnetic field greater than said ground plane area having a lower critical magnetic field, at least a portion of said continuously superconducting conductor being adjacent said ground plane having a lower critical magnetic field, magnetic field means associated with said ground plane area having a lower critical magnetic field for causing said area to become resistive thereby increasing the inductance of said continuously superconducting conductor, and utilization means coupled to said superconducting conductor and responsive to said increased inductance.

5. A controlled inductance circuit comprising:

means for controlling the inductance of a superconducting conductor including;

a ground plane characterized as having at least one area having a lower critical magnetic field than the remainder of the ground plane, at least one continuously superconducting conductor whose inductance is to be controlled associated with said ground plane, at least a portion of said continuously superconducting conductor being adjacent said area, continuously superconducting current means associated with said area for causing the area to become resistive thereby increasing the inductance of said superconducting conductor.

6. A superconducting controlled inductance circuit comprising:

means for controlling the inductance of a continuously superconducting conductor including;

a ground plane of superconducting material having at least one area characterized as having a lower critical magnetic field than the remaining area of said ground plane, at least two parallel continuously superconducting current paths adjacent said ground plane such that a portion of at least one said parallel current path is adjacent said ground plane area having a lower critical magnetic field, each said parallel superconducting current path having a higher critical magnetic field than said ground plane area having a lower critical magnetic field, and means associated with at least one said parallel superconducting current path for causing at least a portion of said ground plane area having a lower critical magnetic field to become resistive thereby increasing the inductance of selected ones of said continuously superconducting parallel current paths.

7. The combination defined in claim 6 wherein said means associated with at least one said continuously superconducting parallel current path includes superconducting current means having a larger critical magnetic field than said area having a lower critical magnetic field than the remaining area of said ground plane.

8. The combination defined in claim 6 wherein said means associated with at least one said continuously superconducting parallel current path includes magnetic field means.

9. A superconducting circuit comprising:

means for controlling the inductance of a superconductor including;

a ground plane of superconducting material having at least one area characterized as having a lower critical magnetic field than the remainder of the ground plane, at least two spaced apart continuously superconducting conductors providing parallel superconducting current paths adjacent said ground plane such that a portion of each said parallel current path is adjacent a said area, each said continuously superconducting conductor having a higher critical magnetic field than said areas, and means associated with each said continuously superconducting conductor for causing at least one of said areas to become resistive thereby increasing the inductance of selected ones of said continuously superconducting conductors.

10. A combination defined in claim 9 wherein said means associated with each said continuously superconducting conductor includes magnetic field means.

11. A combination claimed in claim 9 wherein said means associated with each said continuously superconducting conductor includes continuously superconducting current means.

12. A combination defined in claim 10 wherein said magnetic field means includes a superconducting material having a larger critical magnetic field than said area.

13. A superconducting circuit comprising:

means for controlling the inductance of a continuously superconducting conductor including;

a ground plane having a plurality of areas characterized as having a lower critical magnetic field than the remainder of the ground plane, a superconducting conductor tree circuit providing a plurality of continuously superconducting current paths including a apex and a plurality of branch current paths adjacent said ground plane, at least a portion of each said superconducting branch current paths adjacent one of said areas, and means associated with each said area for causing selected ones of said areas to become resistive thereby increasing the inductance of selected branch current paths.

14. A superconducting circuit providing:

means for controlling the inductance of a continuously superconducing current path including;

a continuously superconducting primary winding, a continuously superconducting secondary winding, at least a portion of said primary winding located adjacent at least a portion of said secondary winding, a shield of superconducting material located between the adjacent portions of said primary and secondary windings, and means for causing said superconducting shield to become resistive thereby enabling the adjacent portions of said primary and secondary winding to be flux linked.

15. The combination defined in claim 14 wherein said superconducting shield has a lower critical magnetic field than said superconducting primary and secondary winding.

16. A superconducting controlled inductance circuit comprising:

means for controlling the inductance of a superconductor including;

a continuously superconducting primary winding, a continuously superconducting closed loop secondary winding, at least a portion of said primary winding located adjacent at least a portion of said secondary winding, a shield of superconducting material associated with the adjacent portions of said primary and secondary windings for preventing flux coupling between said primary and secondary winding, said superconducting shield having a lower critical magnetic field than said superconducting primary and secondary windings, and magnetic field means associated with said superconducting shield for causing said shield to become resistive thereby enabling said adjacent portions of said continuously superconducting primary and secondary to be flux coupled.

References Cited by the Examiner

UNITED STATES PATENTS

| | | | |
|---|---|---|---|
| 2,944,211 | 7/1960 | Richards | 323—94 |
| 2,946,030 | 7/1960 | Slade | 336—155 |
| 2,989,714 | 6/1961 | Park et al. | 307—88.5 |
| 3,098,967 | 7/1963 | Keck | 323—94 |
| 3,145,310 | 8/1964 | Bertuch et al. | 307—88.5 |
| 3,184,674 | 5/1965 | Garwin | 323—44 |
| 3,185,862 | 5/1965 | Beesley | 307—88.5 |

| | | | |
|---|---|---|---|
| 3,191,063 | 6/1965 | Ahrons | 307—88.5 |
| 3,207,921 | 9/1965 | Ahrons | 307—88.5 |
| 3,214,679 | 10/1965 | Richards | 323—44 |

OTHER REFERENCES

Buck, The Cryotron—A Superconductive Computer Component, Proceedings of J.R.E., April 1956; pp. 482–493.

JOHN F. COUCH, *Primary Examiner.*

LLOYD McCOLLUM, *Examiner.*

G. GOLDBERG, W. E. RAY, *Assistant Examiners.*